(12) United States Patent
Potteiger et al.

(10) Patent No.: US 6,272,276 B1
(45) Date of Patent: Aug. 7, 2001

(54) DEVICE AND METHOD FOR RETAINING A LASER MODULE IN AN ORIENTATION SUITABLE FOR TESTING AND SHIPPING

(75) Inventors: Brian Dale Potteiger, Reading; Patrick Allen Reppert, Birdsboro; Rory Keene Schlenker, Lenhartsville, all of PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/173,283

(22) Filed: Oct. 15, 1998

Related U.S. Application Data

(60) Provisional application No. 60/007,018, filed on Dec. 28, 1999.

(51) Int. Cl.[7] ....................................................... G02B 6/36
(52) U.S. Cl. .............................................. 385/135; 385/134
(58) Field of Search ................................... 385/134, 135, 385/76, 14

(56) References Cited

U.S. PATENT DOCUMENTS

| | | | |
|---|---|---|---|
| 4,861,134 | * | 8/1989 | Alameel et al. ................. 360/96.2 |
| 5,353,367 | * | 10/1994 | Czosnowski et al. ............ 385/135 |
| 5,383,051 | * | 1/1995 | Delrosso et al. ................. 359/341 |
| 5,515,200 | * | 5/1996 | Delrosso et al. ................. 359/341 |
| 5,659,641 | * | 8/1997 | DeMeritt et al. .................. 385/14 |
| 5,703,991 | * | 12/1997 | Izumi ................................ 385/135 |
| 5,898,812 | * | 4/1999 | Vanoli .............................. 385/135 |
| 5,915,061 | * | 6/1999 | Vanoli .............................. 385/135 |

* cited by examiner

*Primary Examiner*—Frank G. Font
*Assistant Examiner*—Michael P. Mooney
(74) *Attorney, Agent, or Firm*—Gibbons, Del Deo, Dolan, Griffinger & Vecchione

(57) ABSTRACT

A support assembly for retaining a laser module of the type having a solid state laser, an optical connector and an optical fiber extending between the laser and the optical connector. The support assembly includes a baseplate having a top surface and a bottom surface. A removable spool extends upwardly from the top surface of the baseplate, wherein the spool is sized to have the optical fiber wound therearound. A laser receptacle disposed on the top surface of the baseplate. The laser receptacle is sized to receive the solid state laser in a first predetermined position and orientation. A connector holder is also disposed on the top surface of the baseplate. The connector holder receives and retains the optical connector at a second predetermined position and orientation. As a result, the support assembly retains the solid state laser and the optical connector at known positions that are suitable for automated testing, while the spool retains the optical fiber in a neatly wound condition during the automated testing procedures.

18 Claims, 4 Drawing Sheets

DEVICE AND METHOD FOR RETAINING A LASER MODULE IN AN ORIENTATION SUITABLE FOR TESTING AND SHIPPING

RELATED APPLICATIONS

This application is related to U.S. patent application Ser. No. 09/173,101, filed Oct. 15, 1998, and entitled Spool Support Assembly For The Optical Fiber Of A Laser Module (Potteiger 5-1), now U.S. Pat. No. 6,007,018 issued Dec. 28, 1999 the disclosure of which is incorporated herein by reference.

BACKGROUND OF THE INVENTION

1. Field of the Invention

The present invention relates to support devices that support electro-optical devices and assemblies during automated manufacturing and testing procedures. More particularly, the present invention relates to support devices that retain a laser source and a segment of optical fiber in an orientation suitable for automated testing on an assembly line.

2. Description of the Prior Art

There are many different applications that utilize optical fibers. In an optical fiber system, a laser source is typically used to generate a light signal. The light signal is then propagated through an optical fiber that is attached to the laser source.

In the telecommunications industry, solid state laser sources are commonly manufactured and sold as part of premanufactured module assemblies. In these modules, a solid state laser is attached to a segment of optical fiber. The optical fiber terminates at its free end with some type of fiber optic connector. In this manner, the laser module can be readily integrated into an existing electro-optical system. An example of such a laser module is the Laser 2000 Module, manufactured and sold by Lucent Technologies of Murray Hill, N.J.

There are many different types of premanufactured laser modules currently available. Depending upon the needs of a customer, a premanufactured laser module can be manufactured with a variety of different laser sources, optical fiber types, optical fiber lengths and termination connectors.

Regardless of the type of laser module being manufactured, one of the problems commonly encountered in the manufacturing process is that of the handling of the laser module. As has been previously explained, the laser module contains a laser source and a length of optical fiber that extends from that laser source. The length of the optical fiber often can be up to 80 inches. Such a length of optical fiber is difficult to manipulate. The optical fiber can easily tangle and protrude from an assembly in a random direction. As such, laser modules are not readily adapted to automated manufacturing methods because the random position of the optical fiber would makes automated part positioning and testing very difficult. Instead, due to the awkwardness of the optical fibers, laser modules are often handled and tested by hand during manufacture. In such a manner, the optical fiber can be properly oriented as needed. Although such hand manipulated manufacturing and testing procedures are effective, they are highly labor intensive and expensive.

A need therefore exists for a laser module handling system that can hold a laser module in a set position during manufacturing and testing, thereby allowing automated manufacturing procedures to be used.

SUMMARY OF THE INVENTION

The present invention is a support assembly for retaining a laser module of the type having a solid state laser, an optical connector and an optical fiber extending between the laser and the optical connector. The support assembly includes a baseplate having a top surface and a bottom surface. A removable spool extends upwardly from the top surface of the baseplate, wherein the spool is sized to have the optical fiber wound therearound. A laser receptacle is disposed on the top surface of the baseplate. The laser receptacle is sized to receive the solid state laser in a first predetermined position and orientation. A connector holder is also disposed on the top surface of the baseplate. The connector holder receives and retains the optical connector at a second predetermined position and orientation. As a result, the support assembly retains the solid state laser and the optical connector at known positions that are suitable for automated testing, while the spool retains the optical fiber in a neatly wound condition during the automated testing procedures.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION

Although the present invention device and method can be used to hold many different assemblies that have long wire leads or long optical fiber leads, it is particularly useful in the manufacture and assembly of laser modules that have long optical fiber leads. Accordingly, by way of example, the present invention device and method will be described within the context of manufacturing and testing a laser module.

Figure 1:
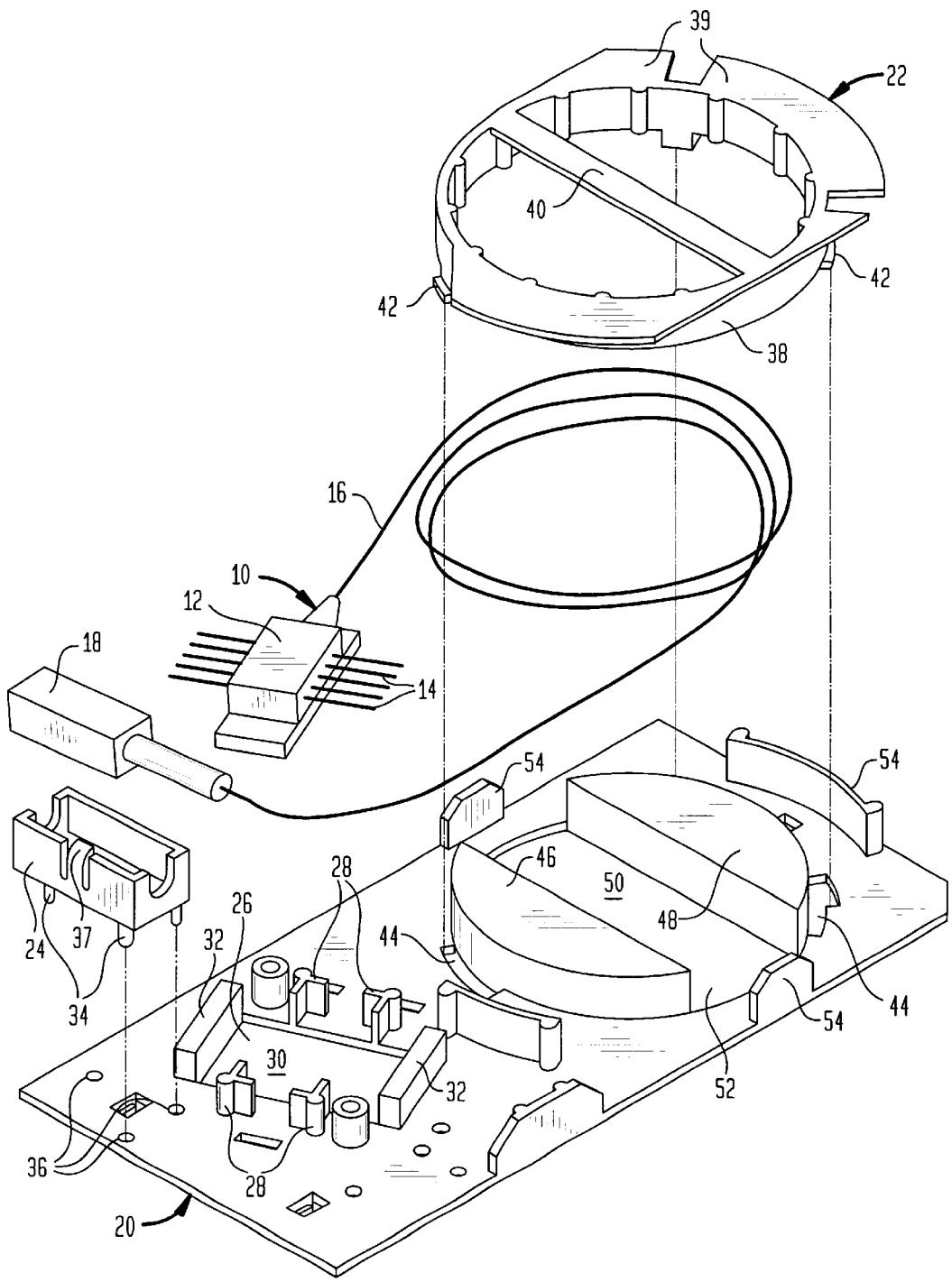
FIG. 1 is an exploded view of an exemplary embodiment of an assembly in accordance with the present invention.

Referring to FIG. 1, a prior art laser module 10 is shown. The laser module 10 is a Laser 2000 Module manufactured by Lucent Technologies, the assignee herein. The shown laser module 10 contains a solid state laser 12. The laser 12 itself has multiple conductive leads 14 that extend outwardly from opposing sides of the solid state laser 12. The conductive leads 14 are used to both power and control the laser 12 during its operation. The conductive leads 14 are also used to power, control and test the laser 12 during its manufacture.

An optical fiber 16 extends from the solid state laser 12. The optical fiber 16 receives the laser light generated by the solid state laser 12 and propagates that light to its free end. The optical fiber 16 can be of any length. However, in many applications the length of the optical fiber 16 is typically less than 80 inches. The free end of the optical fiber 16 terminates with an optical connector 18. Many different types of optical connectors 18 can be used depending upon the needs of a customer ordering the laser module 10.

The present invention is an assembly designed to retain the laser module 10 in a set position while the laser module 10 is tested and shipped by the manufacturer. The assembly includes a baseplate 20, a spool 22 and a connector holder 24. Each of these elements is fabricated from a static dissipative material to prevent the build-up of electrostatic charge. In the preferred embodiment, the baseplate 20, spool 22 and connector holder 24 are molded from a conductive plastic.

Figure 2:
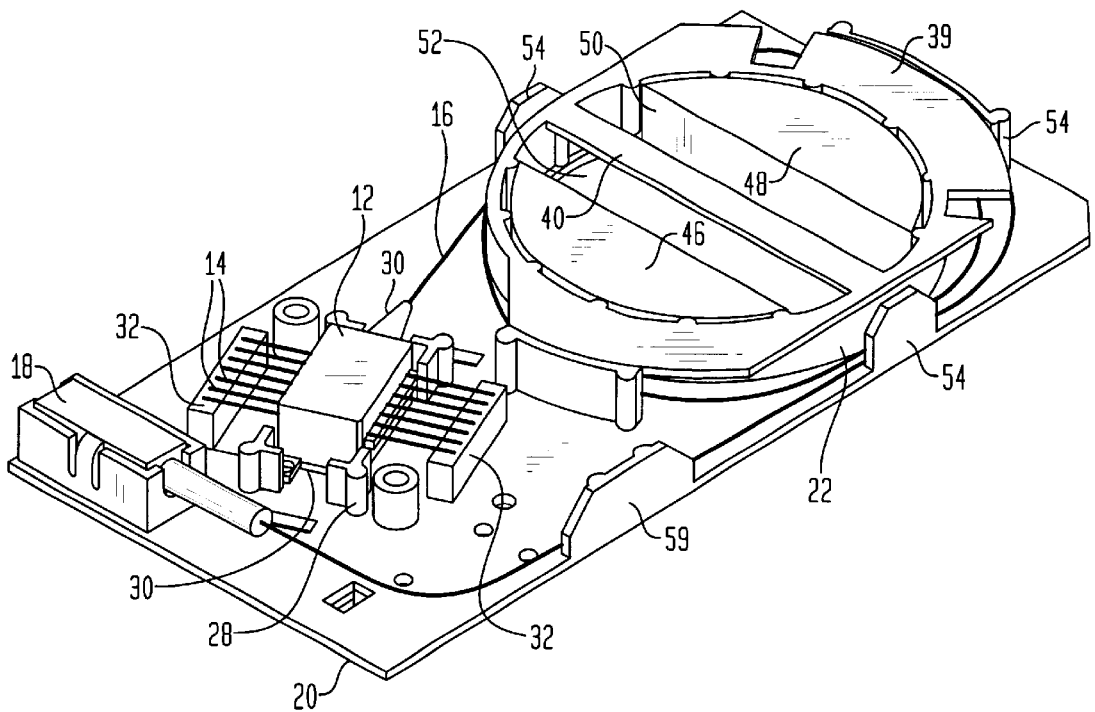
FIG. 2 is a perspective view of the exemplary embodiment of FIG. 1 shown in an assembled condition.

The shown exemplary embodiment of the baseplate 20 is rectangular in shape. Such a shape is merely exemplary and it will be understood that other shapes can be used. A laser test aperture 26 is disposed in one part of the baseplate 20. Corner supports 28 are formed on opposing sides of the laser test aperture 26. The corner supports 28 define a laser receptacle 30, wherein the corner supports 28 receive the corners of the solid state laser 12 and retain the solid state laser 12 in a known fixed position over the laser test aperture 26. Lead supports 32 are present on the baseplate 20 on opposing sides of the laser test aperture 26. The lead supports 32 support the conductive leads 14 of the solid state laser 12 when the laser 12 is positioned within the laser receptacle 30 between the corner supports 28. An illustration of the solid state laser 12 in position over the laser test aperture 26 is shown in FIG. 2.

Still referring to FIG. 1, it can be seen that the connector holder 24 has posts 34 that extend downwardly toward the baseplate 20. The posts 34 engage corresponding holes 36 that are present in the baseplate 20. The posts 34 on the connector holder 24 engage the baseplate holes 36 with a slight interference fit, thereby selectively connecting the connector holder 24 to the baseplate 20. A plurality of different sets of holes can be formed in the baseplate 20. This allows the connector holder 24 to be positioned at a variety of different positions on the baseplate 20 as desired. It also makes it easy to alter the configuration of the overall assembly as different models of laser modules 10 are received.

The connector holder 24 is configured to receive the optical connector 18 being used as part of the laser module 10. As different optical connectors 18 are used, different connector holders 24 can be substituted on the baseplate 20. The connector holder 24 shown contains a pawl 37. The pawl 37 applies a slight bias to the optical connector 18 after the optical connector 18 has been placed within the connector holder 24. The bias of the pawl 37 helps retain the optical connector 18 in place.

The optical fiber 16 that extends from the solid state laser 12 to the optical connector 18 is wound around a spool 22. The spool 22 contains a cylindrical wall 38 around which the optical fiber 16 is wound. The top of the cylindrical wall 38 terminates with a segmented flange 39 that prevents the wound optical fiber 16 from passing over the top of the cylindrical wall 38. A cross element 40 spans across the center of the spool 22 in the same general plane as the flange 39.

Locking tabs 42 extend outwardly from the bottom edge of the cylindrical wall 38. The locking tabs 42 pass through slots 44 in the baseplate 20 and engage the bottom surface of the baseplate 20, as will later be explained.

The baseplate 20 is designed to receive the spool 38. Two arcuate elements 46, 48 extend upwardly from the baseplate 20. The two arcuate segments 46, 48 are arranged as part of a common circle and define a hub structure 50. The hub structure 50 is sized to fit within the cylindrical wall 38 of the spool 22. An open area 52 exists between the arcuate segments 46, 48 of the hub structure 50. As will later be explained, the open area 52 allows space for a person's fingers to engage and turn the cross element 40 of the spool 22 when the spool 22 is engaged with the baseplate 20.

Guide segments 54 are positioned at various points on the baseplate 20 around the hub structure. The guide segments 54 pass around the outside of the spool 22 after the spool 22 is attached to the baseplate 20. The guide segments 54, therefore prevent the optical fiber 16 from unwinding from the spool 22 after the spool 22 is attached to the baseplate 20.

Slots 44 are disposed at various points around the two arcuate segments 46, 48. The slots 44 are positioned and shaped to receive the locking tabs 42 on the bottom of the spool 38. As the spool 22 is attached to the baseplate 20, the locking tabs 42 pass through the slots 44. As the spool 38 is rotated, the tabs 42 engage the bottom surface of the baseplate 20, thereby creating a mechanical connection between the spool 22 and the baseplate 20.

Referring now to FIG. 2, it can be seen that the solid state laser 12 and its conductive leads 14 are held in one set position by the corner supports 28 and lead supports 32 of the baseplate 20. The optical fiber 16 extending from the solid state laser 12 winds around the spool 22. The flange 39 at the top of the spool 22 prevents the optical fiber 16 from raising off of the spool 22. Additionally, the guide elements 54 that surround the spool 22 prevent the optical fiber 16 from unwinding from the spool 22, to any point beyond the bounds of the baseplate 20. Optional secondary guidance elements 59 can be provided at various points between the spool 22 and the optical connector 18 to help prevent the optical fiber 16 from protruding beyond the bounds of the baseplate 20.

From FIG. 2, it can also be seen that the cross element 40 of the spool 22 aligns across the open area 52 between the two arcuate segments 46, 48 of the hub structure 50 on the baseplate 20. The open area 52 between the two arcuate segments 46, 48 therefore provides room for a person to engage the cross-element 40 with his/her fingers and turn the spool 22. By turning the spool 22, a person can cause the spool 22 to either engage or disengage the baseplate 20.

Figure 3:
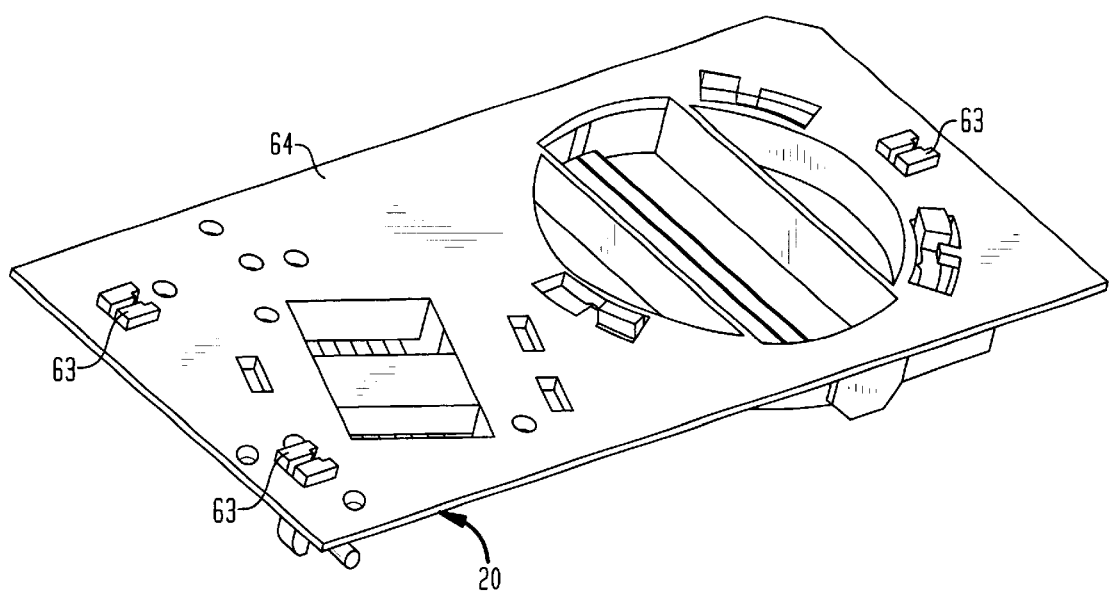
FIG. 3 is a perspective view of the bottom of the exemplary embodiment of FIG. 2.

Referring to FIG. 3, it can be seem that various T-slots 63 are formed on the bottom surface 64 of the baseplate 20. The use of T-slots is merely exemplary and it should be understood that any type of mechanical connection configuration can be used.

Figure 4:
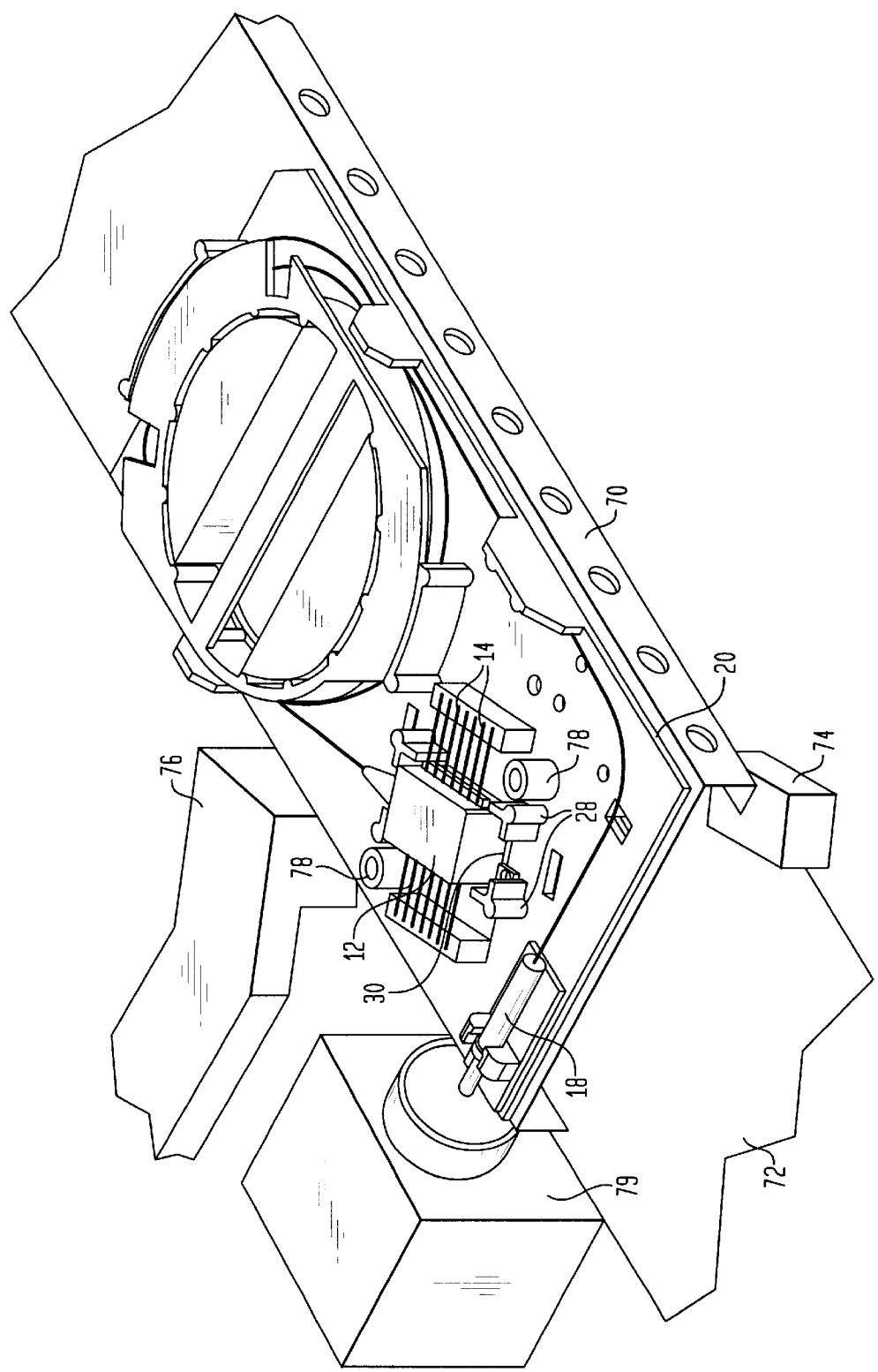
FIG. 4 is a perspective view of the exemplary embodiment of FIG. 2, shown within an automated testing station.

Referring now to FIG. 4, it can be seen that the baseplate 20 of the assembly is adapted to connect to a metal boat 70. The metal boat 70 contains T-protrusions that selectively engage the T-slots on the bottom of the baseplate 20. In the manufacturing procedure, the present invention assembly and metal boat 70 are placed on an automated track 72. The automated track 72 takes the assembly to an automated testing station. Once in the automated testing station a test socket actuator 74 raises up though the metal boat 70 and the baseplate 20 and contacts the solid state laser 12 through the laser test aperture 26 (FIG. 1) that is present in the baseplate 20. The test socket actuator 74 lifts the solid state laser 12 out of the laser receptacle 30 defined by the corner supports 28 and biases the conductive leads 14 of the laser 12 against a fixed test head 76. The test head 76 electrically interconnects with the conductive leads 14, wherein power and diagnostic test commands can be read to the solid state laser 12. Guidance holes 78 can optionally be positioned proximate the laser receptacle 30. The fixed test head 76 may contain guide posts (not shown) that engage the guidance holes 78 thereby ensuring accurate alignment between the solid state laser 12 and the fixed test head 76.

As the solid state laser 12 is interconnected with the fixed test head 76, the optical connector 18 is positioned next in an optical receiver, via an integrating sphere 79. As such, the test station can control the inputs to the solid state laser 12 and can monitor the output of the laser module. Accordingly, the entire laser module can be tested at the test station in an automated fashion. When the testing diagnosis is over, the test socket actuator 74 retracts and again lowers the solid state laser 12 into the corner supports 28 on the baseplate 20.

After the laser module has successfully passed testing, the baseplate 20 is removed from both the metal boat 70 and the assembly track 72. The entire assembly can then be packaged and shipped as a unit. Consequently, the assembly used to retain the laser module during testing can also be used to retain the laser module during shipping. The customer can then remove the laser module from the assembly and recycle the assembly back to the manufacturer.

By using a single assembly to retain the laser module during both testing and shipping, the laser module need not be handled. Accordingly, the potential of damage to the laser module is reduced. Simultaneously, the degree of labor and expense needed to package the laser module is reduced.

It will be understood that the embodiment of the present invention specifically shown and described is merely exemplary and that a person skilled in the art can make alternate embodiments using different configurations and functionally equivalent components. For example, the shape and position of the various elements on the baseplate can be varied to meet the needs of a specific application. All such alternate embodiments are intended to be included in the scope of this invention as set forth in the following claims.

What is claimed is:

1. An assembly for retaining a laser module of the type having a solid state laser, an optical connector and an optical fiber extending between the laser and the optical connector, said assembly comprising:
   a baseplate having a top surface and a bottom surface;
   a spool extending upwardly from said top surface of said base plate, wherein said spool is capable of having the optical fiber wound therearound;
   a laser receptacle disposed on said top surface of said baseplate, wherein said receptacle is sized to receive the solid state laser in a first predetermined position and orientation therein;
   said baseplate having an aperture formed therein below said laser receptacle; and
   a connector holder disposed on said top surface of said base plate for receiving and retaining the optical connector therein at a second predetermined position and orientation.

2. The assembly according to claim 1, wherein said spool is selectively attachable and removable from said baseplate.

3. The assembly according to claim 1, wherein said connector holder is selectively attachable and removable from said baseplate.

4. The assembly according to claim 3, wherein said connector holder is attachable to said baseplate in a plurality of different positions and orientations.

5. The assembly according to claim 1, wherein said laser receptacle includes a plurality of protrusions that extend upwardly from said top surface of said baseplate and limit lateral movement of the laser when positioned between said plurality of protrusions.

6. The assembly according to claim 1, further including a plurality of guide elements extending upwardly from said top surface of said baseplate, wherein said guide element prevents movement of the optical fiber to beyond said baseplate.

7. The assembly according to claim 1, wherein said baseplate, said connector holder and said spool are fabricated from a static dissipative material.

8. An assembly for retaining a laser module of the type having a solid state laser having conductive leads, an optical connector and an optical fiber extending between the laser and the optical connector, said assembly comprising:
   a baseplate having a top surface and a bottom surface;
   a spool extending upwardly from said top surface of said base plate, wherein said spool is capable of having the optical fiber wound therearound;
   a laser receptacle disposed on said top surface of said baseplate, wherein said receptacle is sized to receive the solid state laser in a first predetermined position and orientation therein, said laser receptacle including a plurality of protrusions that extend upwardly from said top surface of said baseplate and limit the lateral movement of the laser when positioned between said plurality of protrusions;
   supports extending upwardly from said top surface of said baseplate to support the conductive leads of the laser when the laser is positioned between said plurality of protrusions;
   a connector holder disposed on said top surface of said base plate for receiving and retaining the optical connector therein at a second predetermined position and orientation.

9. The assembly according to claim 8, wherein said spool contains a handle element for turning said spool with respect to said hub structure, wherein said spool can be selectively turned between a first position, where the spool mechanically engages said baseplate, and a second position, where said spool is free of said baseplate.

10. A laser module assembly, comprising:
    a laser;
    an optical fiber having a first end and a second end, wherein said first end of said optical fiber is coupled to said laser;
    an optical connector coupled to said second end of said optical fiber;
    a baseplate having a top surface;
    a laser receptacle disposed on said top surface of said baseplate, wherein said laser receptacle is sized to receive said laser;
    said baseplate having an aperture disposed therethrough below said laser receptacle;
    a connector receptacle disposed on said top surface of said baseplate wherein said connector receptacle is sized to receive said optical connector; and
    a connector receptacle disposed on said top surface of said baseplate wherein said connector receptacle is sized to receive said optical connector; and
    a spool extending upwardly from said top surface of said baseplate, wherein said optical fiber is wound around said spool while traveling between said laser and said optical connector.

11. The assembly according to claim 10, wherein said spool is selectively attachable and removable from said baseplate.

12. The assembly according to claim 10, wherein said connector holder is attachable to said baseplate in a plurality of different positions and orientations.

13. The assembly according to claim 10, wherein said laser receptacle includes a plurality of protrusions that extend upwardly from said top surface of said baseplate and limit lateral movement of the laser when positioned between said plurality of protrusions.

14. The assembly according to claim 10, wherein said baseplate, said connector holder and said spool are fabricated from a static dissipative material.

15. A method of retaining a laser module in a set orientation, wherein the laser module includes a laser, an optical connector and an optical fiber that extends between the laser and the optical connector, said method comprising the steps of:

provides a support assembly containing a laser receptable, a connector receptacle and a spool;

winding said optical fiber around said spool;

attaching said spool to said support assembly;

placing said laser in said laser receptable;

placing said optical connector in said connector receptable, and lifting said laser while within said laser receptable with respect to said support assembly to carry out testing of said laser.

16. The method according to claim 15, wherein said support material and said spool are both fabricated from a static dissipative material.

17. The method according to claim 15, wherein said connector receptacle is selectively positionable on said support assembly.

18. An assembly for retaining a laser module of the type having a solid state laser, an optical connector and an optical fiber extending between the laser and the optical connector, said assembly comprising:

a baseplate having a top surface and a bottom surface;

a spool extending upwardly from said top surface of said base plate, wherein said spool is capable of having the optical fiber wound therearound, said spool being selectively attachable and removable from said baseplate;

a hub structure extending upwardly from said top surface of said baseplate, wherein said hub structure passes into said spool when said spool is attached to said baseplate;

a laser receptacle disposed on said top surface of said baseplate, wherein said receptacle is sized to receive the solid state laser in a first predetermined position and orientation therein;

a connector holder disposed on said top surface of said base plate for receiving and retaining the optical connector therein at a second predetermined position and orientation.

* * * * *